(12) United States Patent
Shubert

(10) Patent No.: US 7,232,138 B2
(45) Date of Patent: Jun. 19, 2007

(54) WHEEL-DOLLY FOR VEHICLE TOWING AND RECOVERY

(76) Inventor: Arden Royce Shubert, 1920 Sheely Dr., Fort Collins, CO (US) 80526

( * ) Notice: Subject to any disclaimer, the term of this patent is extended or adjusted under 35 U.S.C. 154(b) by 0 days.

(21) Appl. No.: 11/241,548

(22) Filed: Sep. 30, 2005

(65) Prior Publication Data

US 2007/0075511 A1   Apr. 5, 2007

(51) Int. Cl.
    B62B 1/00   (2006.01)
    B62B 3/00   (2006.01)
(52) U.S. Cl. ............... 280/79.4; 280/79.11; 280/47.34
(58) Field of Classification Search ............... 280/79.4, 280/47.34, 79.11
    See application file for complete search history.

(56) References Cited

U.S. PATENT DOCUMENTS

| | | | |
|---|---|---|---|
| 1,275,716 A | | 8/1918 | Maurer, Jr. |
| 2,332,443 A | | 10/1943 | Foringer |
| 2,380,415 A | * | 7/1945 | Carruthers ................. 414/429 |
| 2,392,830 A | * | 1/1946 | Baum ......................... 414/428 |
| 3,504,811 A | * | 4/1970 | Wegener et al. .............. 294/74 |
| 3,690,482 A | * | 9/1972 | Gaumont et al. ........... 414/563 |
| 3,720,422 A | * | 3/1973 | Nelson ......................... 280/35 |
| 3,757,703 A | * | 9/1973 | Roberts .......................... 108/6 |
| 3,954,198 A | | 5/1976 | Sedelmayer |
| 4,690,605 A | | 9/1987 | Cocarro |
| 4,696,484 A | * | 9/1987 | Casey ....................... 280/43.16 |
| 4,854,803 A | | 8/1989 | Cocarro |
| 4,979,856 A | * | 12/1990 | Blunden et al. ................ 410/9 |
| 5,044,645 A | * | 9/1991 | Eltvik ........................ 280/79.4 |
| 5,732,960 A | | 3/1998 | Elam |
| 5,893,571 A | * | 4/1999 | Nowell .......................... 280/43 |
| 5,941,665 A | * | 8/1999 | Dahlin ......................... 410/20 |
| 6,106,214 A | | 8/2000 | Saufelle |
| 2004/0146384 A1 | * | 7/2004 | Whelan ....................... 414/426 |

OTHER PUBLICATIONS

AW Direct Catalog, through Sep. 5, 2005, pp. 138, 142, 143, Issue T505, AW Direct, 83 White Oak Drive, Berlin, CT 06037, www.awdirect.com.

* cited by examiner

Primary Examiner—Christopher P. Ellis
Assistant Examiner—John R. Olszewski

(57) ABSTRACT

A wheel-dolly for use in off-road or on road applications that can be secured to and carry a damaged or immobile wheel affixed to a vehicle over curbs and other obstacles when pulled by a tow truck or its winch. Wheel-dolly can be used singly, in pairs, or in sets for loading immobilized vehicles onto carriers, or for dollying vehicles on a roadway when pulled behind a tow truck.

1 Claim, 5 Drawing Sheets

WHEEL-DOLLY FOR VEHICLE TOWING AND RECOVERY

CROSS-REFERENCE TO RELATED APPLICATION

Not Applicable

FEDERALLY SPONSORED RESEARCH

Not Applicable

SEQUENSE LISTING OR PROGRAM

Not Applicable

BACKGROUND OF THE INVENTION

1. Field of the Invention

This invention relates to a wheel-lift device for lifting and carrying a wheel mounted to an axle of a vehicle. More specifically the present invention is directed toward a wheel-dolly having a lifting means for raising a damaged or immobilized wheel of an automobile, truck, or machine, then carrying that wheel over obstacles when pulled by a winch or tow chain, or carrying wheel mounted on vehicle on a road or street when vehicle is attached to and pulled by a tow truck.

2. Background of the Invention

A wheel-dolly designed for use in the towing and recovery industry must be able to operate in off-road conditions. The dolly must be capable of travel over low curbs, rocks, and other obstacles while carrying an immobile wheel that is mounted on a vehicle. The vehicle and the dolly must be able to be winched by a tow truck over such obstacles. The towing industry now lacks such a device. The object of the present invention is to fill that need.

Wheel-dollies can be defined by design and usage into four classes. Dollies may share basic shapes and lift mechanisms between these classes. Wheel-dollies are usually designed to perform a single function well. Few wheel-dollies can crossover for use between classes as defined below.

A first wheel-dolly class is used to remove and replace wheel assemblies and brakes on vehicles. It is probably the most widely used type of wheel-dolly. It is a shop tool for use with a dismounted wheel assembly and maneuverable by hand. In use the dolly's wheels roll transversely to the wheel it carries. This wheel-dolly class often shares a basic U-shaped frame but is otherwise not comparable to wheel-dollies that carry a vehicle wheel still affixed to vehicle.

A second wheel-dolly class is used in pairs or sets of four to move vehicles within a garage or shop. This dolly class supports each wheel affixed to vehicle on a plurality of casters allowing movement of a vehicle in any direction when maneuvered by hand on a hard surface. H. E. Maurer, Jr., U.S. Pat. No. 1,275,716, August 1918, provided a wheel-dolly on casters that, when used under each wheel, would elevate an automobile so that it could readily be rolled around in limited space, especially within garages. Many variations and improvements to this basic concept have been made over the decades.

A third wheel-dolly class is designed to carry an immobile wheel on a road or street. This dolly's wheels roll parallel with the wheel it carries. It is installed on wheel affixed to towed vehicle's trailing axle in conjunction with leading axle of vehicle being carried by a tow truck. A towing dolly carrying both wheels of trailing axle is more widely used than individual wheel dollies, although several wheel-dolly types in this class are regularly used.

A shop-built wheel-dolly used in Europe has a fixed U-shaped frame with four small wheels mounted on spindles at each end of dolly leg. It requires vehicle to be lifted by a jack for placement of wheel onto dolly from above. Its low cost and narrow profile is an advantage over a towing dolly but seems limited by low towing speeds. Saufelle, U.S. Pat. No. 6,106,214, August 2000, provides a dolly that lifts and carries a wheel affixed to a vehicle using lifting paddles as wheel chocks. This dolly uses an adjustable support pad fixed to a vertical post against the top of the tire. It works best with undamaged wheels and suspension.

A wheel-dolly that carries a wheel affixed to a vehicle and pulled over obstacles by a tow chain or a winch cable connected to a tow truck constitutes a fourth class. Rollers of this wheel-dolly rotate parallel with vehicle axles and vehicle can be skidded on these rollers for turning, avoiding dragging vehicle wheels. A wheel-dolly is secured to each immobile wheel as a roller skate, reducing possible damage to vehicle components from towing. Wheel-dolly provides an indirect connection for attaching winch cable to vehicle. It appears that no existing wheel-dolly is recommended for use with a winch or for off-road usage. The present invention is therefore in a class by itself.

The preferred embodiment of the present invention incorporates one or more cylindrical rollers on each of two axles to traverse obstacles while carrying a vehicle wheel. That wheel, affixed to vehicle, is carried between wheel supports that share parallel axles with rollers. Vehicle's weight is transferred directly to the ground through the shared axle. Tubular axles enable the use of any of several four-point anchor schemes to secure a vehicle wheel to wheel-dolly's U-shaped frame.

Coccaro, U.S. Pat. No. 4,690,605, September 1987, taught a wheel-dolly with casters using a wheel support comprising a partial arc for lifting and carrying a vehicle wheel. The present invention uses a similar wheel support, but operates differently. Coccaro, U.S. Pat. No. 4,854,803, August 1989, further incorporates rollers to support vehicle wheel instead of using the earlier wheel support. Coccaro's wheel dollies with casters thus incorporated major elements of the present invention in separate devices. Both differ from the present invention by using casters to transport vehicle wheel on hard surfaces. The present invention is new and unique by combining the use of rollers that can be towed over soft and irregular surfaces with wheel supports for carrying a vehicle wheel on the same axle. It is also unique because it can be dragged while loaded by winch cables.

The present wheel-dolly uses an integral mechanical or hydraulic jack incorporated within its telescoping side frame that shortens or lengthens distance between dolly axles. Vehicle wheel is raised by shortening dolly frame causing wheel supports to rotate upward lifting vehicle wheel between them. If vehicle wheel is free to rotate, a single wheel support will raise through its arc before the second wheel support moves. If wheel is not free to rotate, each wheel support rotates upward in a synchronized manner to approximately similar angles. Vehicle wheel remains centered between axles in either case. A combined rotation of less than thirty degrees is adequate for wheel supports to raise a vehicle wheel. Wheel-dolly can carry vehicle wheel locked at an angle to vehicle's direction of travel by incorporating striations on wheel support surface and by making necessary adjustments on chain or strap devices when securing wheel to wheel-dolly.

Wheel supports arc within upper inner quadrants formed by wheel-dolly's axles and frame. Rotation of wheel supports is limited by vertical and horizontal stops incorporated within ends of wheel-dolly frame.

A preferred scheme for selectively connecting wheel-dolly to vehicle chassis is for first chain to course freely through round or oval-shaped chain guides in wheel-dolly frame. First chain extends rearward, there looping through a chain slip hook connected to an anchor to vehicle chassis, then coursing forward to be secured in wheel-dolly's rear chain latch. Forward end of first chain loops loosely from front chain guide to front chain latch, providing a chain loop for connecting winch cable slip hook. This scheme allows lighter weight, more flexible chain to be looped while providing higher working load limits compared to a single heavier chain. Winch cable is connected by this scheme to both vehicle chassis and to wheel-dolly. Because chain freely passes through chain guides and slip hooks, all chain segments are loaded equally when pulled by a winch. Wheel-dolly attachment scheme provides a low line of draft for winching vehicle upward over obstacles.

A vehicle wheel is also secured to wheel-dolly using two-point or four-point attachment schemes. A two-point scheme connects vehicle to wheel-dolly at the inner ends of axles using a chain looping over vehicle axle and further coursing through dolly axles. Chain ends are joined using a chain binder. Four-point attachments are made to inner and outer ends of both wheel-dolly axles.

Tubular wheel-dolly axles are preferred for use with second chains to secure vehicle wheel to wheel-dolly. An all chain device for holding vehicle wheel adapts parts from a common tire chain. At least two cross links extend across top of vehicle wheel approximately sixty degrees apart. A shorter outer tire chain having a master link at each end drops over face of wheel near its center. Inner tire chain having longer ends drop behind wheel, then course outward through tubular dolly axles. Chains are fished through axles using a rigid heavy wire hook. Chains turn upward for attachment to master links near the center of outer face of wheel.

An alternative basket strap device helps avoid possible chain damage to vehicle. Device is comprised of two longer parallel straps passing across the wheel at approximately a sixty-degree arc near its top, a plurality of shorter straps connecting the parallel straps near their centers. One longer strap is secured ahead of center of wheel by a chain segment coursing outward through forward axle of wheel-dolly and made taut by an integral strap winch hooked to that chain segment. Second longer parallel strap is then secured to rear axle of wheel-dolly behind centerline of vehicle wheel.

A wheel-dolly with small diameter rollers might require axles having an inside diameter too small for a second chain to pass through. Hooks can replace chain segments of basket straps, engaging removable eyebolts easily installed into wheel-dolly's axles with the simplest of tools, while avoiding any fixed protuberance extending from wheel-dolly.

Vehicle manufacturers may require that only wheel restraints be used for attaching a wheel-dolly to vehicles having independent suspensions. If wheel-dolly is to be used exclusively with such vehicles, a keyhole strap hooking over button-type connectors installed within axle ends is a simpler but less versatile alternative to basket straps or chain devices used with tubular axles.

Wheel-dolly can be used singly, in pairs, or in sets of four to move a vehicle. A pair of wheel-dollies used under drive axle facilitates moving a vehicle with its transmission locked in park position onto a car carrier without skidding vehicle wheels and tires. Four wheel-dollies facilitate damage-free loading of a locked four-wheel drive vehicle onto a car-carrier without skidding any tires across roadway. A vehicle can be towed with wheels carried by wheel-dollies for some distance and can be especially useful for clearing a vehicle causing traffic blockage from a busy street.

Wheel-dollies of this type can be used in pairs to carry a vehicle on roads in place of axle dollies or other wheel-dollies of the third class that are built to transport immobile wheels on roads. The present wheel-dolly offers the advantage of functioning as a recovery dolly as well. Use, practice, and experience will determine the preferred size and composition of rollers and other components that work best for dual purpose wheel-dollies.

Many vehicles, including recreational vehicles, have weak extended frames that require they be lifted and carried only by its axle or wheels. If a rear axle bearing failed on such a vehicle, a low loading angle truck or trailer is more likely to be used for recovery than a wrecker. If the vehicle's frame angles to the ground behind the failed axle, any attempt to load it onto a trailer from the front or rear can cause the frame to bend because the slightest upward angle of the tilted truck or trailer causes vehicle frame to support substantial weight at its end. A preferred recovery method lifts the axle. A wheel-dolly is a cost effective alternative available for recovering and loading a vehicle with axle failure onto a low loading-angle truck or trailer.

A road version of wheel-dolly can carry an axle with bearing failure without using a trailer. It carries its load only inches high, much lower than it could be carried on any trailer. It simplifies loading. Oversize equipment that might be over legal height when transported on trailers might alternatively be transported legally using heavy-duty wheel-dollies. Tubular axles accommodate larger diameter bushings for recovery dollies or wheel bearings of a size comparable to those used in truck axles for roadway towing. Wheel-dolly can be adapted for carrying industrial, construction, and agricultural equipment wheels on highways. A plurality of pneumatic tires might be used instead of rollers on axles of wheel-dolly for towing large vehicles or equipment having tall wheels. Trailer brake assemblies of several designs appear adaptable for mounting and use with larger versions of wheel-dolly.

Wheel-dollies work best with rollers less than one half the radius of vehicle wheel it carries. Multiple rollers can be used on each wheel-dolly axle for carrying dual wheels or wide industrial or agricultural tires. Wheel-dolly accommodates different wheel sizes by sizing wheel-dolly frame length to wheel and adapting hardware used to secure vehicle wheel or axle to wheel-dolly.

The present invention differs from other wheel-dollies by incorporating attachment schemes to secure wheel-dolly to vehicle chassis, to vehicle wheel, and accommodate attachment of tow chains and winch cables. A strong, yet lightweight wheel-dolly is achieved by using axle for both rollers and wheel supports and by using secured vehicle wheel to brace and strengthen wheel-dolly axles. The simple, sturdy design of this wheel-dolly will lift and carry a damaged or immobile vehicle wheel over obstacles when pulled by a wrecker winch or tow chain.

Industry magazines and catalogs provide a guide for available equipment and current usage. A leading nationwide vendor of towing accessories is AW Direct of Berlin, Conn. Its website, www.awdirect.com, and its comprehensive catalogs advertise wheel-dollies and tire skates that are available to the towing industry. A copy of pages 142–143 of their catalog "T505, good through Sep. 16, 2005" is attached. The pages describe and illustrate "GoJaks®" models GJ-5000, GJ-5400, and GJ-6000, all wheel-dollies with casters, along with a user warning that the dollies should not be used as towing dollies. Also advertised and illustrated are Auto Positioning Dollies MH98A, B, and C. AW Gear Tire Skates, models TS-400, TS-420, and TS-440 are recommended for loading car carriers. Wreck Master Skates WM-1 and WM-3 are adaptable to flat or wide tires and to brake rotors on vehicles without wheels.

Another page (138) describes Collins-Pacific Inc self-loading towing dollies, Models CD-20A, B, C, and D, and CD-25A, B, C, and D, that carry an axle of a vehicle and might be used by towing operators as a recovery dolly. Such usage is not mentioned in accompanying text and dollies are probably not recommended or designed for off-road recovery.

BACKGROUND OF INVENTION—OBJECTS AND ADVANTAGES

The main object of this invention is to introduce a wheel dolly able to lift and carry an immobile or damaged wheel that is attached to a vehicle over curbs and other obstacles as well as on a street or highway.

A second object of the invention is to provide a device that can be used with tow trucks and winches without damaging the dolly or the vehicle it carries.

A third object of the invention is to provide such a device in a size, weight, and form that can be used for loading car carriers or trailers.

Another object of the invention is to provide a device with provisions for securing it to a vehicle wheel or axle during winching or during transport.

An additional object of the invention is to create a design that can be easily manufactured.

Additional objects and advantages of this invention will be set forth in the following description. They will in part be obvious from the description or may be learned by practice of the invention.

SUMMARY

The present invention provides a wheel-dolly that can lift and carry a wheel mounted on a vehicle over curbs and other obstacles and on roads. Wheel-dolly can be secured to vehicle wheel or to vehicle chassis using one or more chain or wheel strap devices. Wheel-dolly frame incorporates chain latches and chain guides providing a point for attaching a tow truck's winch cable without direct attachment to vehicle chassis. This wheel-dolly, when used alone or in a plurality, provides a means to load a vehicle with damaged or immobile wheels onto a truck or trailer, or to tow a vehicle having immobile wheels on a roadway to a storage or repair facility using a tow truck.

REFERENCE NUMERALS IN DRAWINGS

10 Wheel-dolly
12 Vehicle Wheel
14 Outer Frame
16 Inner Frame
18 Axle
20 Roller
22 Wheel Support
24 Vertical Stop
26 Horizontal Stop
28 Jack
30 Chain Guide
32 Chain Latch
34 First Chain
36 Second Chain
38 Axle collar
40 Eyebolt
42 Nut with Eye
44 Chain Binder
46 Basket Strap Assembly

DETAILED DESCRIPTION

Figure 1:
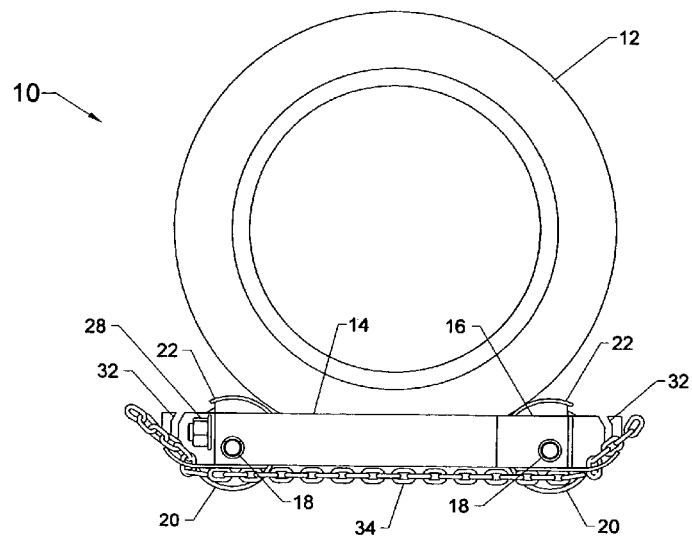
FIG. 1 is a first side view of loaded wheel-dolly having a vehicle wheel resting on wheel supports and with a first chain coursing through chain guides.

The present invention is a wheel-dolly 10 that uses two rollers 20 to carry a wheel affixed to a vehicle over obstacles and across terrain. FIG. 1 is a street side view of wheel-dolly 10 carrying vehicle wheel 12 and further showing inner frame 16 fully retracted within outer frame 14. Vehicle wheel 12 is raised before any chains are attached. Closing telescoping frames 14 and 16 cause wheel supports 22 to lift vehicle wheel 12 within wheel-dolly 10. Wheel supports 22 and rollers 20 are each affixed to and rotate on axles 18, transferring load of vehicle wheel 12 through axle 18 directly to the ground, thereby substantially reducing wheel-dolly frame stress. First chain 34 is installed coursing longitudinally from wheel-dolly 10 to connect to vehicle chassis and to a winch cable.

Figure 2:
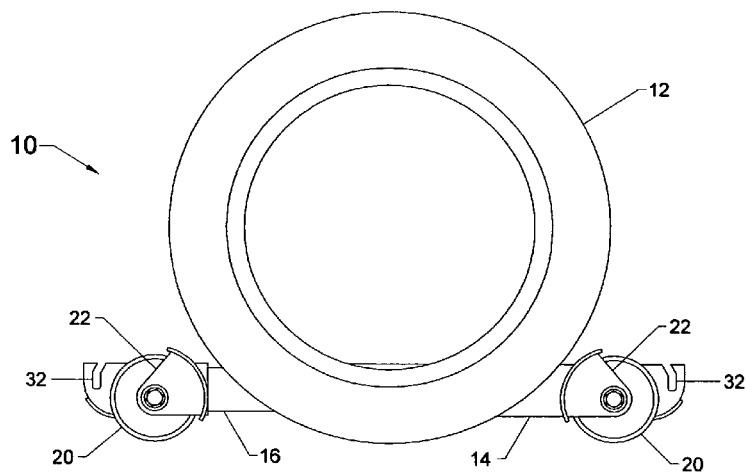
FIG. 2 shows the opposite side view of an unloaded and expanded wheel-dolly in place to lift and carry a vehicle wheel.

Preferred operation of the present invention first orients wheel-dolly's U-shaped frame's open end against a wheel. FIG. 2 is an under car perspective of wheel-dolly 10 as it would normally be placed for lifting wheel 12. Wheel supports 22 rest against horizontal stops 26 shown in FIG. 3. The height of wheel-dolly 10 is preferred to be no more than one half the radius of vehicle wheel. Its low profile allows wheel-dolly 10 to be positioned under most vehicle bodies. Wheel-dolly may be installed from under the vehicle if vehicle wheel rests against an obstruction such as a curb.

Figure 3:
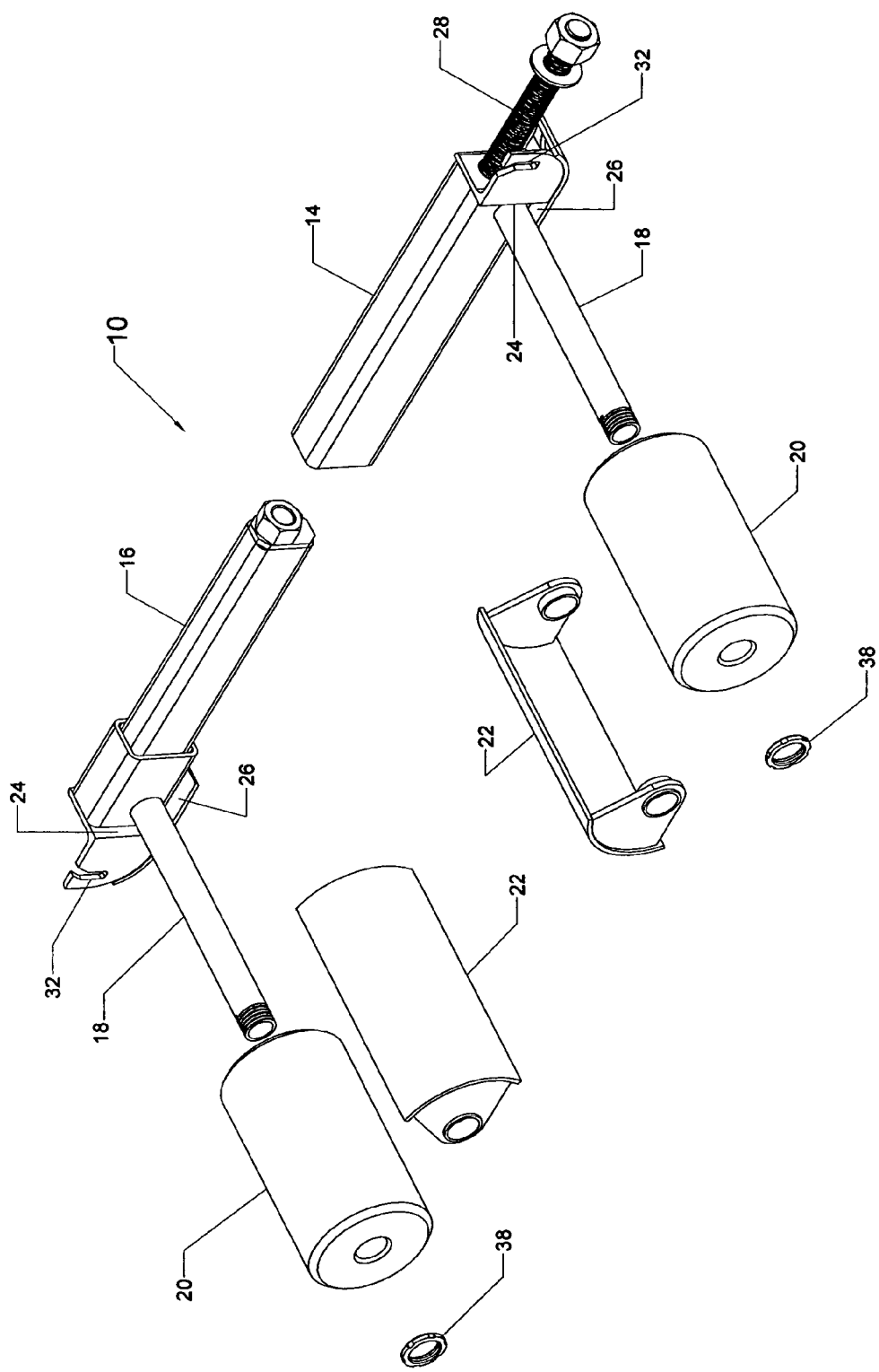
FIG. 3 shows an exploded view of wheel-dolly components.

FIG. 3 is an exploded view showing components comprising basic wheel-dolly 10. Jack 28 adjusts outer frame member 14 to inner frame member 16, shortening or lengthening wheel-dolly 10. Fabricated into outer ends of inner frame 14 and outer frame 16 are vertical stops 24 that limit upward rotation, and horizontal stops 26 that limit downward rotation of wheel supports 22. Axles 18, chain guides 30, and chain latches 32, are also incorporated into each outer end.

FIG. 3 further shows wheels supports 22 that straddle rollers 20 when installed on axles 18. When assembled wheel supports 22 rotate only within the upper inner quadrant of wheel-dolly 10, limited by vertical stops 24 and horizontal stops 26. Rollers 20 and wheel supports 22 are retained to axles 18 by axle collars 38.

It is preferred that wheel-dollies be used in pairs that differ only by axle 18 extending outward from opposite sides of outer frame 14 and inner frame 16. This allows jack 28 to be operated from the front of wheel-dolly on both left and right wheels although wheel-dolly can always be used in either direction. Jack 28 is shown as a screw jack and can be operated using a hand wrench or by any of several types of common power tools, causing wheel supports 22 to rotate upward while supporting wheel 12 between rollers 20 as outer frame 14 telescopes inward over inner frame 16. Other types of mechanical or hydraulic jacks can be substituted for screw jack 28 illustrated.

First chain 34 is shown coursing under wheel-dolly's frame and slipping unrestricted through chain guides 30. First chain 34 extends rearward and, after connecting by a slip hook to an anchor affixed to vehicle chassis, returns to and secured in rear chain latch 32. The other end of first chain 34 loops forward engaging tow hook, then rearward to be secured in front chain latch 32. First chain 34 slips through chain guides 30 and within slip hooks, making first chain 34 a loop that equalizes chain load throughout its length when pulled taut by tow truck or its winch cable. First chain 34, looping between chain guide 30 and chain latch 32, provides a low line of draft for towing and recovery by pulling from wheel-dolly 10 near the bottom of vehicle wheel 12.

Chain latch 32, illustrated in FIG. 2, can be of any type, illustrated is a simple latch using a link slot having a dogleg opening. First chain when doubled provides higher working load limits by using twice the length of more flexible chain and having approximately the same chain weight. For example, ¼" Grade 80 alloy chain, having a working load limit of 4,100 pounds, when doubled 8,200 pounds, has higher working load limits compared to using a single ⅜" Grade 80 alloy chain. That chain provides a working load limit of just 7,300 pounds and is more difficult to handle. Weight per hundred feet of ¼" Grade 80 chain is 74 pounds compared to 147 pounds for ⅜" Grade 80 alloy chain per hundred feet. A doubled lighter chain is preferred for use over a single heavier chain.

Figure 4:
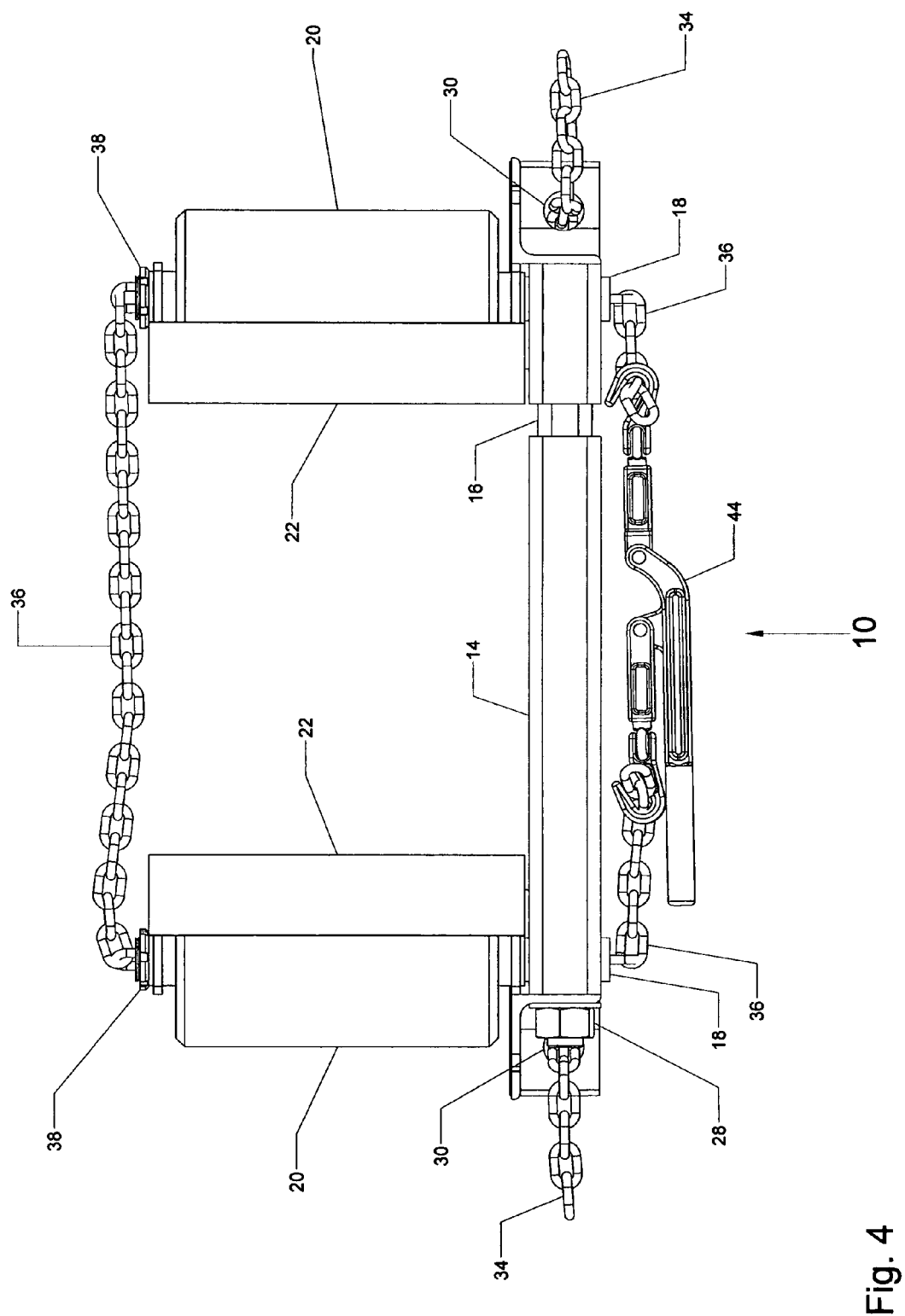
FIG. 4 is a top view of unloaded and expanded wheel-dolly showing first and second chains.

FIG. 4 is a top view of wheel-dolly 10 showing segments of first chain 34 coursing through chain guides 30, passing below outer frame 18 and inner frame 16. FIG. 4 shows a second chain 36 coursing through tubular axles 18 providing a means for securing to inner ends of axles 18. Second chain 36 loops upward passing over solid axle housing of trucks or machines carried between axles 18. Second chain 36 extends through axles 18 and chain ends are connected using chain binder 44 at some span within the loop. Tubular axles 18 also provide the means to secure vehicle wheel 12 to wheel-dolly 10 using chains, straps, or combinations of chains, eyebolts, and straps.

Chain guides 30 may be round but an oval shape is preferred. Diameter must be greater than link width of first chain 34 and, if oval shaped, it is preferred that the oval be longer than a chain link of first chain 34 so it easily slips through without binding. An oval shape chain guide 30 further can be used for attaching a tow hook directly to wheel-dolly 10 when a first chain 34 is not used.

Different restraint schemes are expected to be used depending on conditions. Tow trucks having twin winches might be hooked to a pair of wheel-dollies 10 using first chains 34 providing a means to distribute high towing forces at vehicle by pulling from wheels and from vehicle chassis by attaching to each side of vehicle. Vehicle wheel 12 might be secured to wheel-dolly 10 using basket strap assembly 46 for this operation. Wheel-dolly 10, when used for moving a vehicle having locked wheels on a hard and level surface, would need no such restraint. First chains 34 and basket strap assemblies 46 might be used or not used individually or in combination depending on conditions. It is conceivable that in some cases a plurality of wheel-dollies 10 might be all secured to wheels and connected to each other by chain, including connecting to vehicle chassis and to tow truck.

Figure 5:
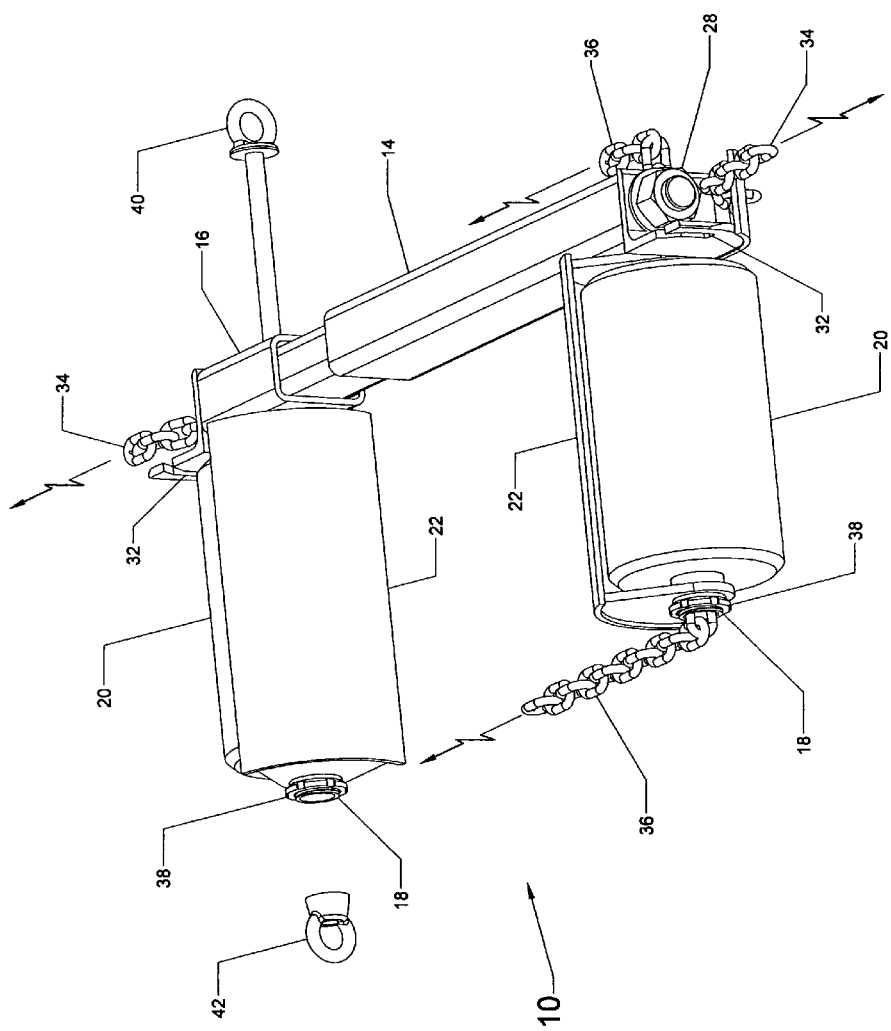
FIG. 5 is a perspective view of loaded wheel-dolly showing a first chain, a second chain coursing through its lower axle, and an eyebolt for installation through its upper axle in drawing.

FIG. 5 shows axles 18 providing inner and outer anchors using different hardware. Upper axle 18 in drawing shows eyebolt 40 inserted into axle 18, to be secured at inner end using nut with eye 42. Eyebolt 40 can be installed using only a rod as a tool. Eyes hold hooks attached to straps of basket strap assembly 46. Lower axle 18 illustrated in FIG. 5 shows a second chain 36 that can be fixed to an end of basket strap assembly 46 in lieu of hook. A second chain 36 courses through axle 18 engaging strap winch hook in a similar manner to hook engaging eyebolt 40, illustrated in FIG. 6. Eyebolt alternative provides a means for basket strap assembly 46 to be used with smaller axles that may not have an inner diameter adequate to accommodate second chain 36.

It is recognized that fasteners can be permanently fixed to ends of axles 18. This alternative will not accommodate using a second chain 36 to attach wheel-dolly 10 to a solid truck axle as described for FIG. 4. Instead it must be used exclusively with four point wheel restraint schemes.

Figure 6:
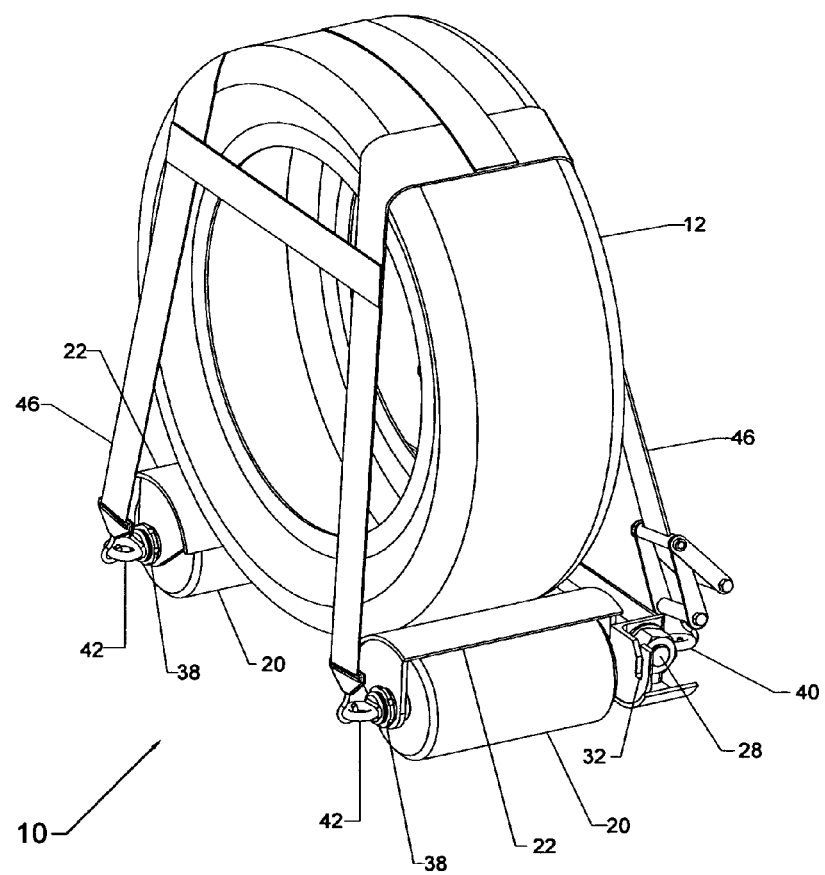
FIG. 6 is a perspective view of wheel-dolly showing vehicle wheel restrained by basket strap device.

Basket strap assembly 46 illustrated in FIG. 6 secures vehicle wheel 12 to each inner and outer end of axles 18. Several attachment schemes can be used to accomplish a four-point restraint as illustrated in FIG. 6. A first scheme is shown in FIG. 6 that includes a strap device assembly 46 having two longer straps passing across vehicle wheel 12 ahead and behind of its centerline. Longer straps are connected by a plurality of cross straps. Longer straps include a strap winch with a hook at outer end and a hook at inner end. Hooks engage eyelets of eyebolt 40 and nut with eye 42. Strap winches pull straps taut against vehicle wheel 12 and, by holding it tightly against wheel supports 22, cause vehicle wheel 12 to support and reinforce axles 18 against shock and strain.

A variation of the scheme exchanges eyebolts 40 and nuts with eyes 42 for two short second chains 36 attached to inner end of longer straps of basket strap assembly 46. Second chains 36 course through axles 18 from inside to out, and connecting with strap winch hooks near outer ends of axles 18 and near outer frame 14 and inner frame 16. This scheme is preferred for attaching basket strap assembly 46 to wheel-dolly 10 because it eliminates several components, yet still providing a four-point restraint scheme.

A third variation replaces straps using parts of a common tire chain assembly having at least two cross-links. Inner chain of tire chain assembly becomes a different embodiment of second chain 36 and is held against top of inner vehicle wheel 12 by cross-links, drooping downward at ends, then coursing outward through axles 18. Outer chain of tire chain assembly also connects with cross-links near outer face of vehicle wheel 12 near its top. The shorter outer chain droops downwards from cross-links to a tire chain master link at each of its ends, hanging near the center face of vehicle wheel 12. Ends of second chain 36 turn upward from outer axles 18 for connecting to tire chain master links. This variation provides four-point restraint using chain only.

Each of the three variations described secure vehicle wheel 12 to wheel-dolly 10 in the same manner using four-point restraint. The several variations illustrate a number of similar restraint schemes compatible with wheel-dolly 10.

It should be understood that a wide variety of changes and modifications can be made to the preferred embodiment described above. It is therefore intended that the present invention is not limited to the embodiments described above, but encompasses any and all embodiments within the scope of the following claims, and equivalents thereof.

CONCLUSIONS, RAMIFICATIONS, AND SCOPE OF INVENTION

In 1918 Maurer Jr, U.S. Pat. No. 1,275,716 introduced a wheel-dolly for maneuvering a wheeled vehicle within a garage on a hard surface. Later embodiments are used today for similar purposes. New usage for wheel dollies includes aligning a vehicle for loading onto a car carrier. However no wheel-dolly is considered to be strong enough to be used with a winch.

Automobiles and recovery equipment for automobiles have changed more since Maurer's patent was issued than have wheel-dollies. The present invention uses some of the old while providing users a new and different wheel-dolly.

The present invention provides an easy to use wheel-dolly that can be sized to accommodate wheels on all road vehicles, most industrial, construction, and agricultural equipment, and many aircraft. The wheel-dolly can carry damaged wheels with flat tires and fully inflated tires mounted on undamaged wheels. The wheel-dolly can carry locked or otherwise non-rotating wheels as easily as it can carry wheels that rotate freely. Versions of this wheel-dolly can be equipped with hard rubber rollers for street and roadway use or steel rollers that can roll over obstacles and be skidded sideways across terrain. Pneumatic tires might be incorporated for roadway transport of large vehicles that require low lift height for vehicle to pass under obstacles. Trailer brake assemblies of several designs might be compatible with some wheel-dollies.

The present invention can be used singly, in pairs, or in sets carrying all of vehicle's wheels. Wheel-dollies can be secured only to the wheel it carries, to the vehicle at one or both ends, or to other wheel-dollies. Wheel-dolly can also be attached to solid axle housings used on most trucks and industrial and agricultural equipment. Tow trucks having twin winches can have tow hooks each connected to a wheel-dolly for maximum winching power applied to each chain and pulling from both wheel-dolly frame and vehicle chassis. Attachment schemes provide a very low line of draft, essentially pulling vehicle from the bottom of tire carried in wheel-dolly.

The present invention is compatible with many types of jacks and with hydraulic cylinders powered by truck hydraulics. Wheel-dolly frame can accommodate mechanical latches to lock frame length for long distance towing.

Large wheel-dollies equipped with pneumatic tires rather than rollers might be used to transport large industrial, construction, and agricultural equipment. Their use would substantially reduce transport height of such equipment, even when compared to its transport on drop-deck trailers.

The present invention can be used with tow trucks and towing devices of all types. It can be used to carry a single damaged wheel or a pair of immobilized vehicle wheels of a trailing axle when vehicle is towed with leading axle carried by a tow truck. It can be used in pairs or sets of four to load locked and immobilized vehicles onto car carries without dragging or scuffing vehicle tires.

The present invention is simple but strong and can be used with the simplest of tools or with portable power tools and equipment. It is relatively compact for storage and transport. It has a real size and weight advantage over trailers designed for carrying immobilized vehicles. It also works to load and unload such trucks and trailers if desired.

I claim:
1. A wheel-dolly for carrying a vehicle wheel assembly attached to a vehicle, comprising:
   a telescoping frame that has chain guides fixed to the frame at outer ends on an undersurface of the frame, chain latches fixed to the frame at outer ends, and axles fixed to the frame at outer ends;
   wheel supports arcing on said axles between horizontal and vertical travel stops at each end of the frame;
   at least one roller installed on each of the axles within the wheel supports;
   a jacking device capable of lifting and carrying the wheel between the axles on the rollers;
   a first chain coursing through said chain guides beneath the wheel dolly and securing said first chain in the chain latches, wherein the wheel-dolly is adapted to be attached to a tow truck and the vehicle through the first chain.

* * * * *